US010712167B2

(12) United States Patent
Zhao

(10) Patent No.: US 10,712,167 B2
(45) Date of Patent: Jul. 14, 2020

(54) METHODS, SYSTEMS, AND DEVICES FOR DISPLAYING MAPS

(71) Applicant: Alibaba Group Holding Limited, George Town (KY)

(72) Inventor: Wen Zhao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/419,742

(22) Filed: May 22, 2019

(65) Prior Publication Data
US 2019/0271558 A1 Sep. 5, 2019

Related U.S. Application Data

(63) Continuation of application No. PCT/CN2017/112554, filed on Nov. 23, 2017.

(30) Foreign Application Priority Data

Nov. 30, 2016 (CN) .......................... 2016 1 1076419

(51) Int. Cl.
G01C 21/36 (2006.01)
G01C 21/32 (2006.01)
(Continued)

(52) U.S. Cl.
CPC ......... *G01C 21/3664* (2013.01); *G01C 21/32* (2013.01); *G01C 21/3614* (2013.01);
(Continued)

(58) Field of Classification Search
CPC ............... G01C 21/32; G01C 21/3614; G01C 21/3664; G01C 21/3679; G06F 16/29; G06F 16/9537
See application file for complete search history.

(56) References Cited

U.S. PATENT DOCUMENTS 5,802,492 A * 9/1998 DeLorme ........... G01C 21/3476
340/990
6,321,158 B1 * 11/2001 DeLorme ............... G01C 21/26
340/995.16
(Continued)

FOREIGN PATENT DOCUMENTS

CN 101500021 8/2009
CN 101847325 9/2010
(Continued)

OTHER PUBLICATIONS

TeachuGis. "Google Maps on Android: How to measure distance." Youtube, May 3, 2016, https://youtu.be/IGZ3FiQiVol (Year: 2016).*
(Continued)

Primary Examiner — Robert T Nguyen
(74) Attorney, Agent, or Firm — Fish & Richardson P.C.

(57) ABSTRACT

The present disclosure provides systems and methods that perform actions including: receiving a user input selecting a current location within a map displayed on a screen of the terminal device; generating a request message indicating a request for a location relationship between the selected current location and a target location, the request message including an identifier of the current location, the target location being a location currently or previously displayed on the map; transmitting the request message to a map server configured to determine a geographical location of the current location and a geographical location of the target location; receiving, from the map server, a location relationship between the current location and the target location, wherein the location relationship is determined based on the geographical location of the current location and the geographical location of the target location; and displaying a graphical indicator representing the location relationship.

17 Claims, 12 Drawing Sheets

(51) Int. Cl.
*G06F 16/29* (2019.01)
*G06F 16/9537* (2019.01)
(52) U.S. Cl.
CPC ......... *G01C 21/3679* (2013.01); *G06F 16/29* (2019.01); *G06F 16/9537* (2019.01)

(56) References Cited

U.S. PATENT DOCUMENTS

| | | | |
|---|---|---|---|
| 2003/0109266 A1 | 6/2003 | Ratiah et al. | |
| 2007/0156335 A1* | 7/2007 | McBride | G01C 21/20 701/533 |
| 2009/0105947 A1* | 4/2009 | Nachesa | G01C 21/343 701/533 |
| 2011/0193795 A1 | 8/2011 | Seidman et al. | |
| 2012/0053829 A1 | 3/2012 | Agarwal et al. | |
| 2013/0131986 A1* | 5/2013 | Van Seggelen | G01C 21/34 701/533 |
| 2013/0253832 A1* | 9/2013 | Nallu | G06O 30/0633 701/537 |
| 2013/0262222 A1 | 10/2013 | Gibson et al. | |
| 2013/0325340 A1 | 12/2013 | Forstall et al. | |
| 2013/0326425 A1* | 12/2013 | Forstall | G01C 21/3638 715/851 |
| 2013/0339891 A1 | 12/2013 | Blumenberg et al. | |
| 2014/0052714 A1* | 2/2014 | Brodziak | G06Q 10/02 707/722 |
| 2014/0074401 A1* | 3/2014 | Otani | G01C 21/3461 701/533 |
| 2014/0365120 A1* | 12/2014 | Vulcano | G01C 21/265 701/532 |
| 2014/0365934 A1* | 12/2014 | Moore | G06F 3/04815 715/769 |
| 2015/0185991 A1* | 7/2015 | Ho | G06F 3/0484 715/771 |
| 2016/0138932 A1* | 5/2016 | Ichinokawa | G01C 21/367 701/454 |
| 2016/0178380 A1* | 6/2016 | Iwaizumi | G01C 21/3682 701/409 |
| 2016/0313138 A1* | 10/2016 | Chupakhin | G01C 21/32 |
| 2017/0123618 A1* | 5/2017 | Porcella | G06F 16/29 |
| 2018/0059687 A1* | 3/2018 | Hayes | G08G 1/202 |

FOREIGN PATENT DOCUMENTS

| | | |
|---|---|---|
| CN | 102135433 | 7/2011 |
| CN | 103063210 | 4/2013 |
| CN | 105992153 | 10/2016 |
| CN | 107066472 | 8/2017 |
| EP | 2733651 | 5/2014 |
| WO | WO 2004113841 | 12/2004 |
| WO | WO 2016200703 | 12/2016 |

OTHER PUBLICATIONS

International Preliminary Report on Patentability in International Application No. PCT/CN2017/112554, dated Jun. 4, 2019, 10 pages (with English Translation).
International Search Report and Written Opinion in International Application No. PCT/CN2017/112554, dated Feb. 26, 2018, 15 pages (with English Translation).
Extendend European Search Report in European Application No. 17875878.5, dated Aug. 13, 2019, 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

METHODS, SYSTEMS, AND DEVICES FOR DISPLAYING MAPS

CROSS-REFERENCE TO RELATED APPLICATIONS

This application is a continuation of PCT Application No. PCT/CN2017/112554, filed on Nov. 23, 2017, which claims priority to Chinese Patent Application No. 201611076419.0, filed on Nov. 30, 2016, and each application is hereby incorporated by reference in its entirety.

TECHNICAL FIELD

The present invention pertains to the information processing field, and in particular, to a method and system for displaying maps, a terminal, and a map server.

BACKGROUND

With development of intelligent terminal technologies, the intelligent terminal becomes a necessity in daily life of users. In addition, because the intelligent terminals are portable, users install more and more application programs on the intelligent terminals, to use the application programs anytime and anywhere.

SUMMARY

Currently, most intelligent terminals include a map display function. During a daily trip, users can query a route or navigate by using the map display function on the intelligent terminals. After a user enters (for example, types an address of) a specific destination, the existing map display function on the intelligent terminal displays general information of the destination on a map.

In map display, the user can know a specific situation around the destination by moving the map. For example, the user can know restaurant, entertainment, or other ambient environment around the destination by moving the map. In this process, the user usually loses a sense of direction and a sense of distance after moving or scaling up/down the map, and therefore may have a hard time determining an orientation relationship between a specific point and the destination in a current view, for example, a distance between the specific point and the destination, or a specific orientation of the specific point relative to the destination. As a result, navigation efficiency is low, and user experience is poor.

FIG. 1 is a schematic diagram illustrating a map view in a map navigation. When a user attempts to find "Zhengda Wudaokou Square", the user enters the search word in a search bar of a map, to locate the map to "Zhengda Wudaokou Square". When the user starts to query restaurant or entertainment around the destination, or wants to know about the ambient environment because, for example, the user wants to rent a house nearby, the current user can view a surrounding situation only by moving or scaling up/down the map. After the map is moved or scaled up/down, eventually even the destination disappears from the field of view, as shown in FIG. 2. When the user views the map in this case, the user may have a hard time determining a location of the destination "Zhengda Wudaokou Square". As a result, the search for the surroundings is meaningless.

The present invention provides a method and system for displaying maps, a terminal, and a map server, to alleviate a problem that in the existing map display on an intelligent terminal, a user usually loses a sense of direction and a sense of distance after moving or scaling up/down a map, resulting in low navigation efficiency.

The present invention provides a method for displaying maps, including: sending, by a terminal, a request message to a map server, where the request message carries an identifier of a current location; obtaining, by the map server, location information of the current location based on the identifier of the current location; obtaining, by the map server, a location relationship between the current location and a target location based on the location information and location information of the target location; and returning, by the map server, the location relationship to the terminal for display.

The present invention provides another method for displaying maps, including: sending a request message to a map server, where the request message carries an identifier of a current location; receiving a location relationship that is between the current location and a target location and that is sent by the map server, where the location relationship is obtained by the map server based on location information of the current location and location information of the target location, and the location information of the current location is obtained based on the identifier of the current location; and displaying the location relationship on a map.

The present invention provides another method for displaying maps, including: receiving a request message sent by a terminal, where the request message carries an identifier of a current location; obtaining location information of the current location based on the identifier of the current location; obtaining a location relationship between the current location and a target location based on the location information of the current location and location information of the target location; and returning the location relationship to the terminal for display.

The present invention provides a system for displaying maps, including: a terminal, configured to send a request message to a map server, where the request message carries an identifier of a current location; and a map server, configured to obtain location information of the current location based on the identifier of the current location, obtain a location relationship between the current location and a target location based on the location information and location information of the target location, and return the location relationship to the terminal for display.

The present invention provides a terminal, including: a sending module, configured to send a request message to a map server, where the request message carries an identifier of a current location; a receiving module, configured to receive a location relationship that is between the current location and a target location and that is sent by the map server, where the location relationship is obtained by the map server based on location information of the current location and location information of the target location, and the location information of the current location is obtained based on the identifier of the current location; and a display module, configured to display the location relationship on a map.

The present invention provides a map server, including: a receiving module, configured to receive a request message sent by a terminal, where the request message carries an identifier of a current location; an acquisition module, configured to obtain location information of the current location based on the identifier of the current location, and obtain a location relationship between the current location and a target location based on the location information and location information of the target location; and a feedback module, configured to return the location relationship to the terminal for display.

According to the method and system for displaying maps, the terminal, and the map server that are provided in the present invention, the terminal sends the request message to the map server, where the request message carries the identifier of the current location; the map server obtains the location information of the current location based on the identifier of the current location; the map server obtains the location relationship between the current location and the target location based on the location information of the current location and the location information of the target location; and the map server returns the location relationship to the terminal for display. In the present invention, the map server can obtain the location information of the current location and the location information of the target location, so that the map server can determine the location relationship between the current location and the target location. It can alleviate a problem that in the existing map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

DESCRIPTION OF IMPLEMENTATIONS

The following describes in detail the method and system for displaying maps, the terminal, and the map server that are provided in the implementations of the present invention with reference to the accompanying drawings.

Implementation 1

Figure 3:
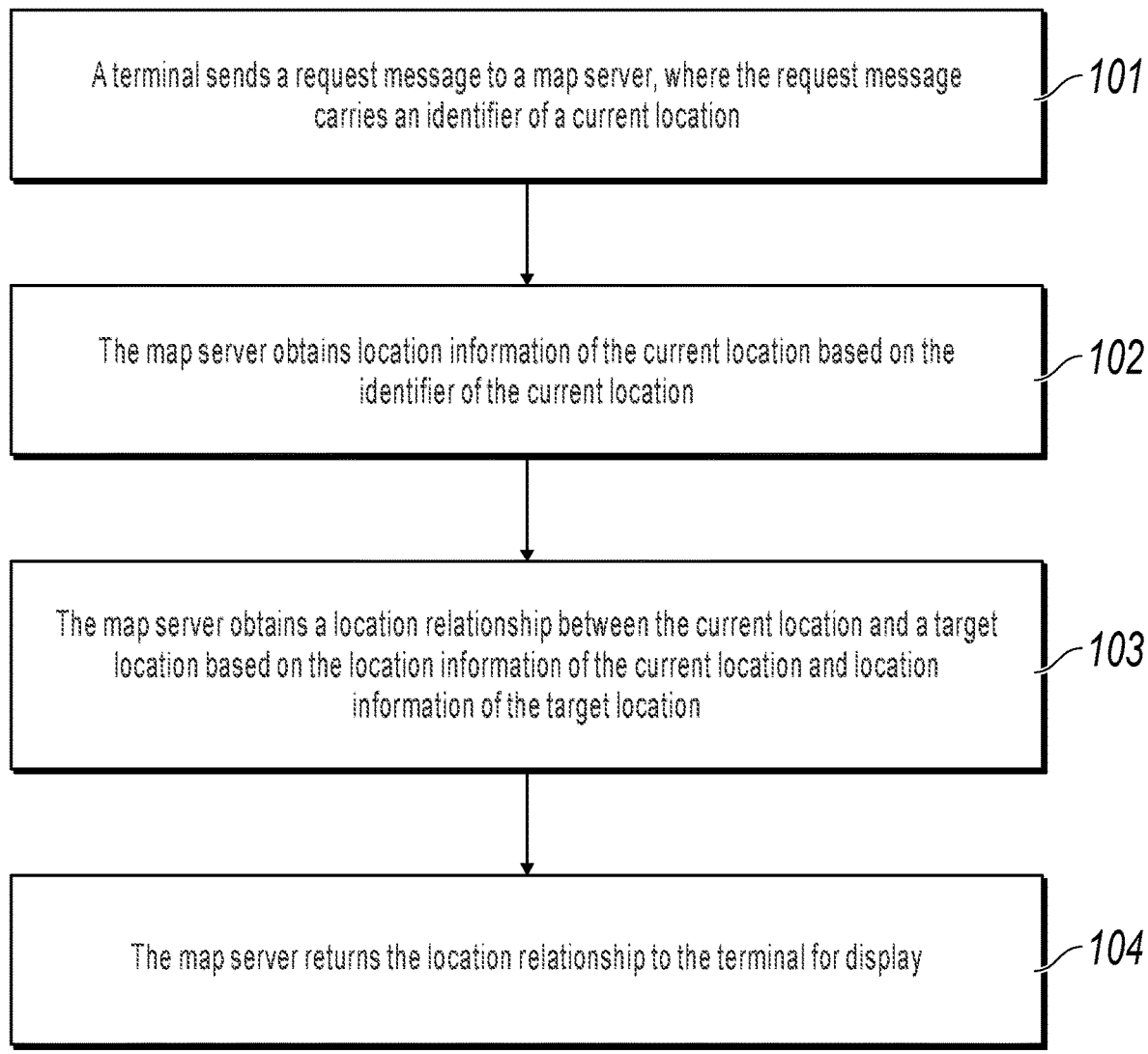
FIG. 3 is a schematic flowchart illustrating a method for displaying maps, according to implementations of the present invention.

FIG. 3 is a schematic flowchart illustrating a method for displaying maps, according to implementations of the present invention. As shown in FIG. 3, the method for displaying maps includes the following steps.

S101. A terminal sends a request message to a map server, where the request message carries an identifier of a current location.

When a user searches a map for a specific target location, for example, "Zhengda Wudaokou Square", the user can enter the search word in a search bar, to locate a map view in a range of the target location. When the user attempts to know a surrounding situation, the user can know the surrounding situation of the target location by dragging or scaling up/down the map or in other ways.

After dragging or scaling up/down the map, if the user wants to know a location relationship between the currently displayed location (also referred herein as "the current location") and the target location, that is, a distance between the current location and the target location and an orientation relationship between the current location and the target location, the user can press and hold a screen with a finger to send the request message to the map server.

Specifically, the terminal can perform monitoring, by using a sensor display screen installed on the terminal, to detect a gesture of the user. When detecting that the user presses and holds the screen, the terminal generates the request message based on the current location corresponding to an area that the user presses and holds, and adds the identifier of the current location to the request message. The identifier of the current location can be a name, code, etc., of the current location. After generating the request message, the terminal sends the request message to the map server, so that the map server can return the location relationship between the current location and the target location.

S102. The map server obtains location information of the current location based on the identifier of the current location.

After receiving the request message sent by the terminal, the map server obtains an identifier of the current location from the request message, and then finds the location information of the current location based on the identifier of the current location. The location information is geographical coordinates of the current location, that is, longitude and latitude data of the current location.

S103. The map server obtains a location relationship between the current location and a target location based on the location information of the current location and location information of the target location.

After obtaining the location information of the current location, the map server can calculate a location relationship between the two locations based on the location information of the current location and the location information of the target location, to obtain the location relationship between the current location and the target location. The location relationship is a distance between the current location and the target location and an orientation relationship between the current location and the target location.

In this implementation, before the map server obtains the location relationship between the current location and the target location, the map server further needs to obtain the location information of the target location. Specifically, the map server can obtain the location information of the target location when searching for the target location. The location information is geographical coordinates of the target location, that is, longitude and latitude data of the target location.

S104. The map server returns the location relationship to the terminal for display.

After the map server obtains the location relationship between the current location and the target location, the map server can return the location relationship to the terminal. After receiving the location relationship, the terminal can display the location relationship on the map, to provide direction guidance for the user.

Preferably, the terminal forms an indication line between the current location and the target location, and the terminal displays the location relationship between the current location and the target location on the indication line. Specifically, the current location can be connected to the target location by using one indication line, and then the distance between the two points is displayed on the indication line.

Optionally, the distance between the current location and the target location is displayed based on a predetermined distance interval. After the current location and the target location are connected by using one indication line, several coverage circles are formed between the current location and the target location based on the predetermined distance interval. Then, a distance between each coverage circle and the target location is calculated based on the distance interval, and the distance is marked on the coverage circle.

Figure 4:
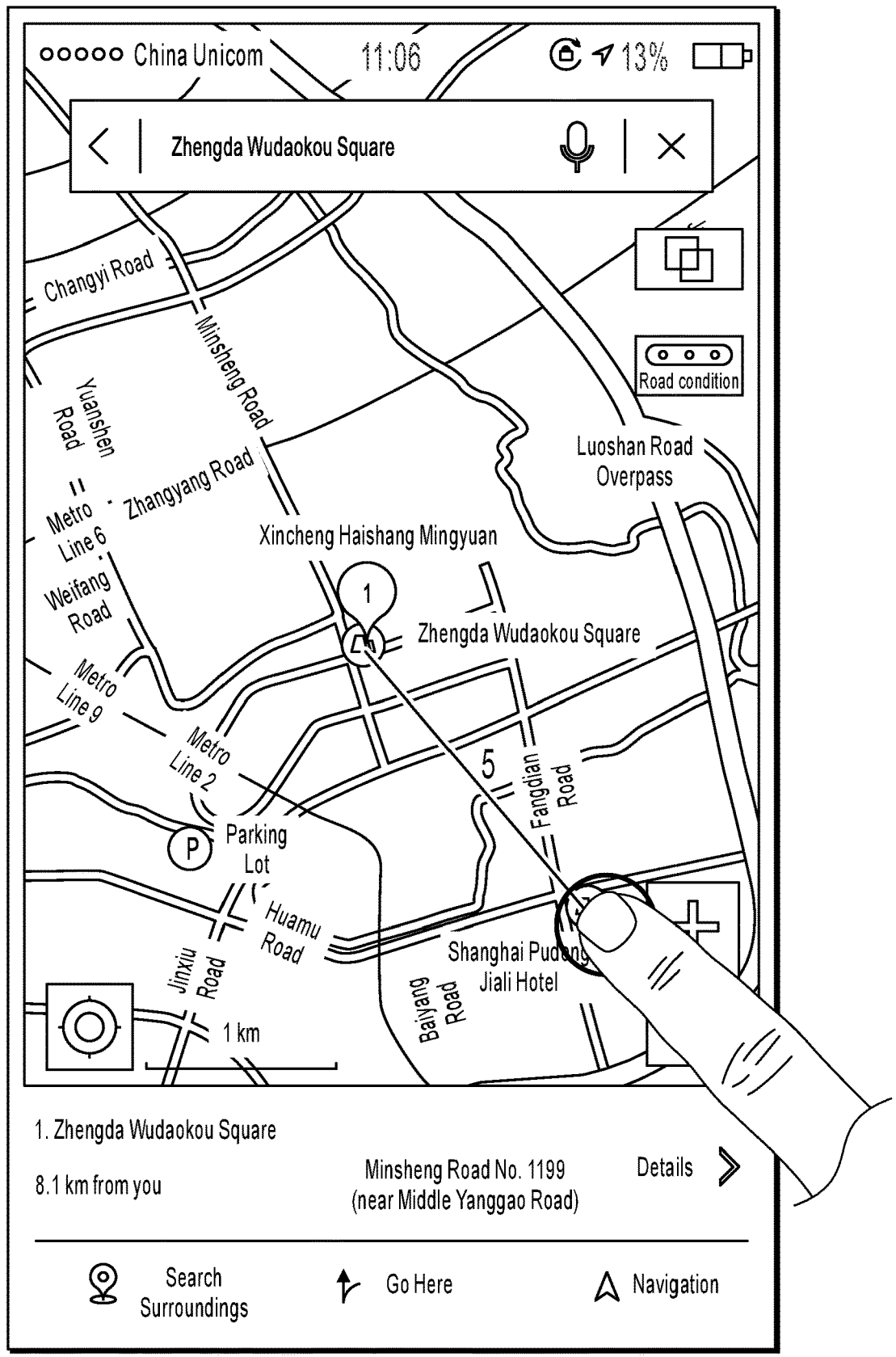
FIG. 4 is a schematic application diagram illustrating a display of a map, according to implementations of the present invention.

FIG. 4 is a schematic application diagram illustrating a display of a map, according to the present implementations. As shown in FIG. 4, after a user finds a target location "Zhengda Wudaokou Square", a map view can be located to a range of the target location. When the user attempts to know a surrounding situation, the user may move the map on the screen and reach a current location "Shanghai Pudong Jiali Hotel." If the user wants to know a location relationship between the current location and the target location, the user can press and hold the area of "Shanghai Pudong Jiali Hotel" on a screen with a finger, and the terminal can send a request message to the map server. The map server can obtain the location relationship between "Shanghai Pudong Jiali Hotel" and "Zhengda Wudaokou Square", and then return the location relationship to the terminal for display. As shown in FIG. 4, an indication line can be formed between "Shanghai Pudong Jiali Hotel" and "Zhengda Wudaokou Square", and then a distance between the two points is marked on the indication line. An orientation and the distance between the current location and the target location can be specified by using the indication line, so that the user can quickly obtain positioning information.

Figure 5:
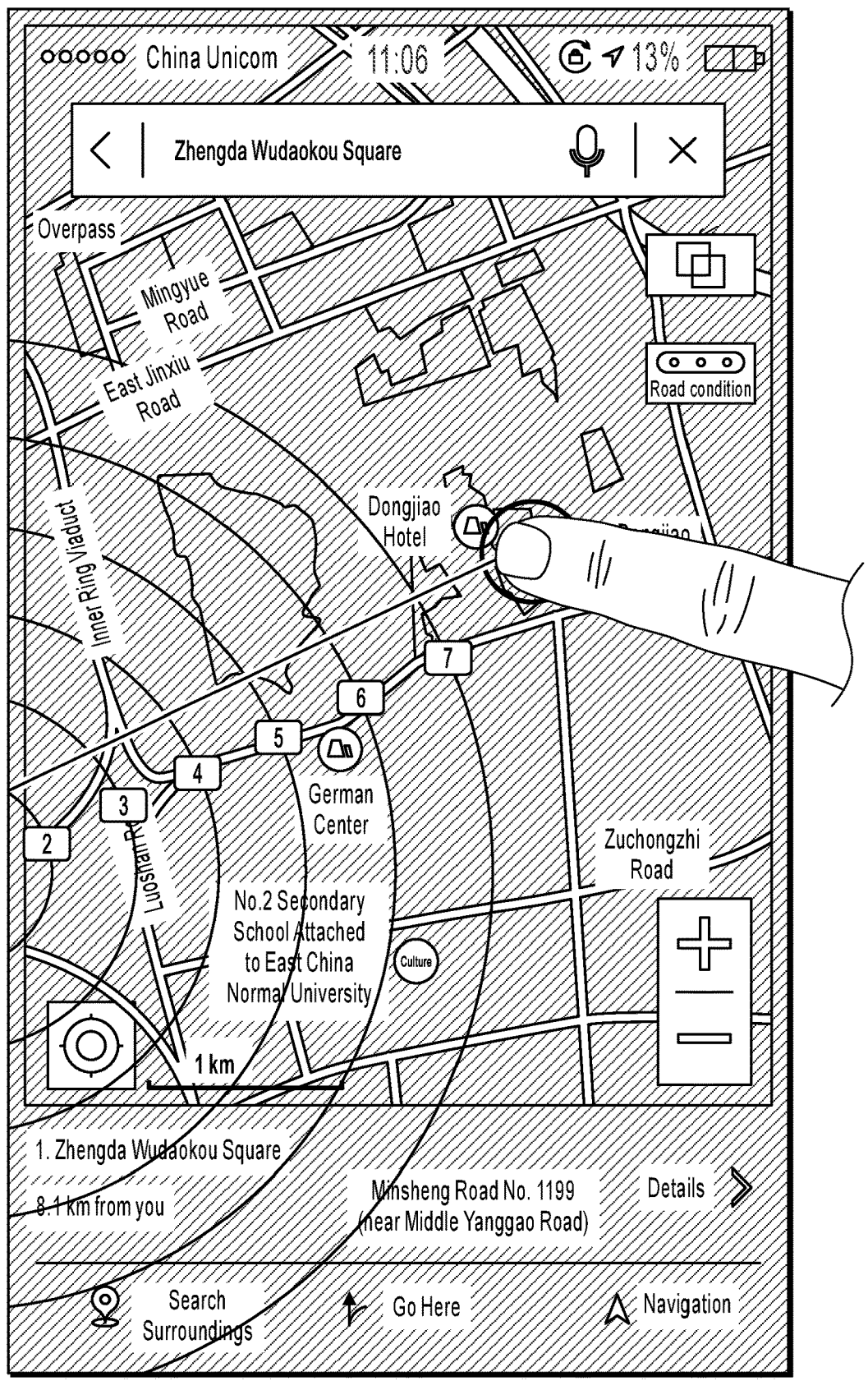
FIG. 5 is a schematic application diagram illustrating a display of a map, according to implementations of the present invention.

FIG. 5 is a schematic application diagram illustrating a display of a map, according to implementations of the present invention. After the user reaches a current location "Dongjiao Hotel" by moving the map, it can be seen from FIG. 5 that because "Dongjiao Hotel" is far away from the target location, the target location has disappeared from the map view. In this case, if the user wants to know a location relationship between the current location and the target location, the user can press and hold the area of "Dongjiao Hotel" on the screen with a finger, and the terminal can send a request message to the map server. The map server can obtain the location relationship between "Dongjiao Hotel" and "Zhengda Wudaokou Square", and then return the location relationship to the terminal for display. As shown in FIG. 5, an indication line can be formed between "Dongjiao Hotel" and "Zhengda Wudaokou Square", and then several coverage circles can be formed between "Dongjiao Hotel" and "Zhengda Wudaokou Square" based on a predetermined distance interval. Then, a distance between each coverage circle and the target location is calculated based on the distance interval, and each distance is marked on the respective coverage circle. An orientation and a distance between the current location and the target location can be specified by using the indication line, so that the user can quickly determine the target location.

According to the method for displaying maps, the terminal sends the request message to the map server, where the request message carries an identifier of the current location; the map server obtains the location information of the current location based on the identifier of the current location; the map server obtains the location relationship between the current location and the target location based on the location information and the location information of the target location; and the map server returns the location relationship to the terminal for display. In this implementation, the map server can obtain the location information of the current location and the location information of the target location, so that the map server can determine the location relationship between the current location and the target location. It can alleviate a problem in a conventional map display on an intelligent terminal, where a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

Implementation 2

Figure 6:
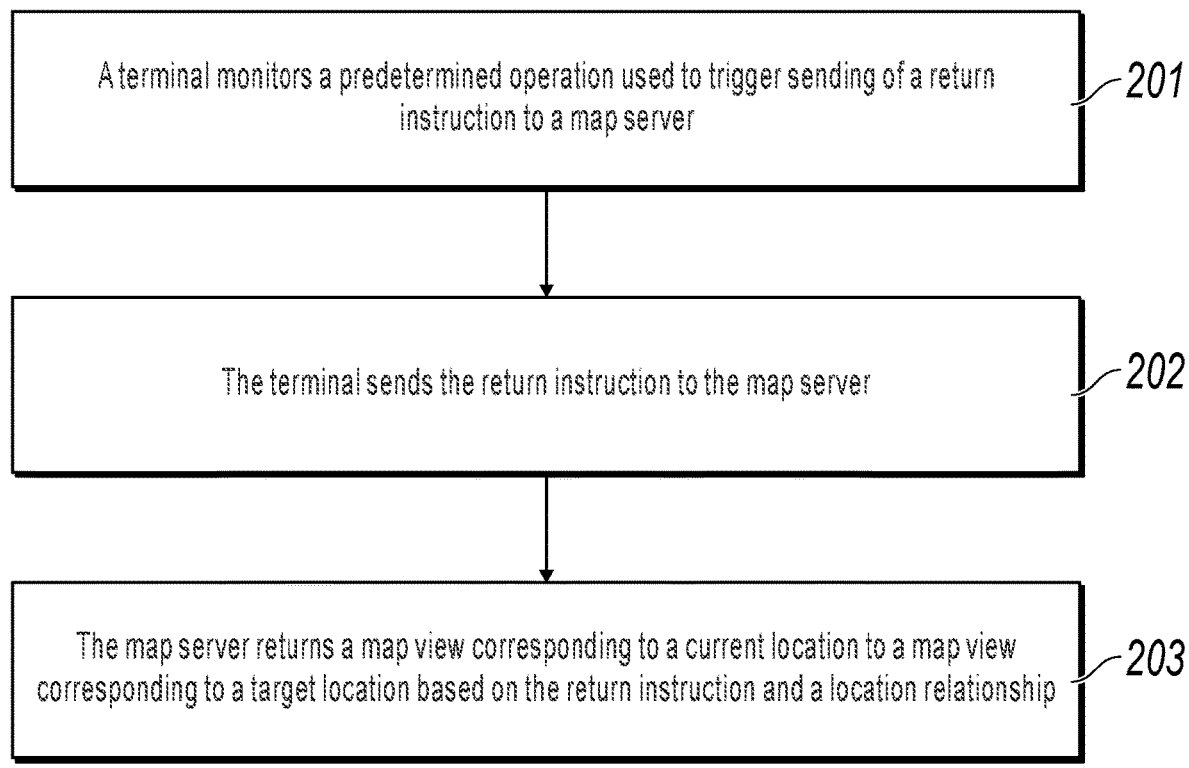
FIG. 6 is a schematic flowchart illustrating a method for displaying maps, according to implementations of the present invention.

FIG. 6 is a schematic flowchart illustrating a method for displaying maps, according to implementations of the present invention. Following the previous implementation, after the map server returns the location relationship to the terminal for display, the method for displaying maps includes the following steps.

S201. The terminal monitors a predetermined operation used to trigger sending of a return instruction to the map server.

The return instruction is used to instruct to return a map view to a map view corresponding to the target location.

S202. The terminal sends the return instruction to the map server.

After the user knows the surrounding situation of the target location by moving or scaling up/down the map, the user may need to return to the target location. In this implementation, to conveniently return the map view to the map view corresponding to the target location, the user can trigger, by using some predetermined operations, the terminal to generate the return instruction, and return the map from a map view corresponding to the current location to the map view corresponding to the target location based on the return instruction. In some embodiments, to improve convenience of the return, the user can shake a terminal (for example, a mobile phone) to trigger the terminal to send the return instruction to the map server. That is, the terminal monitors the predetermined operation used to trigger sending of the return instruction to the map server, and the terminal sends the return instruction to the map server after the operation is monitored.

S203. The map server returns a map view corresponding to the current location to a map view corresponding to the target location based on the return instruction and the location relationship.

After receiving the return instruction, the map server can return the map view from the map view corresponding to the current location to the map view corresponding to the target location based on the location relationship between the current location and the target location.

In this implementation, the map server can obtain the location information of the current location and the location information of the target location, so that the map server can determine the location relationship between the current location and the target location. It can alleviate a problem that in the existing map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

Further, when the user needs to return to the target location, the terminal can switch the map view to the map view corresponding to the target location only by sending the return instruction to the map server, without requiring the user to perform an operation such as manual dragging or scaling up/down. It is convenient, quick, and accurate, and improves user experience.

Implementation 3

Figure 7:
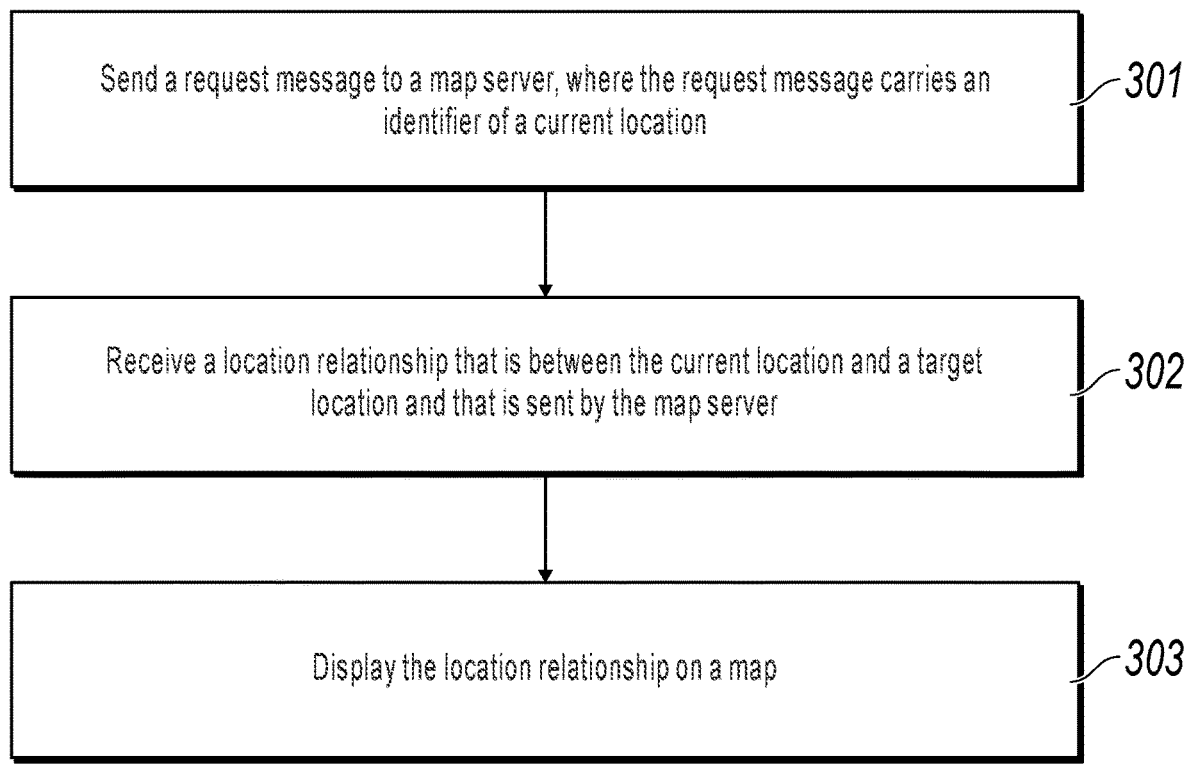
FIG. 7 is a schematic flowchart illustrating a method for displaying maps, according to implementations of the present invention.

FIG. 7 is a schematic flowchart illustrating a method for displaying maps, according to implementations of the present invention. As shown in FIG. 7, the method for displaying maps includes the following steps.

S301. Send a request message to a map server, where the request message carries an identifier of a current location.

In this implementation, the method for displaying maps is performed by a terminal, and the terminal can be a portable device such as a mobile phone or an iPad.

When a user searches a map for a specific target location, for example, "Zhengda Wudaokou Square", the user can enter the search word in a search bar, to locate a map view to a range of the target location. When the user attempts to know a surrounding situation, the user can know the surrounding situation of the target location by dragging or scaling up/down the map or in other ways to get to a current location in the surroundings of the target location.

After dragging or scaling up/down the map, if the user wants to know a location relationship between the current location and the target location, that is, a distance between the current location and the target location and an orientation relationship between the current location and the target location, the user can press and hold a screen (that displays the map) with a finger to send the request message to the map server.

Specifically, the terminal can perform monitoring by using a sensor display screen installed on the terminal, to detect a gesture of the user. When detecting that the user presses and holds the screen, the terminal generates the request message based on the current location corresponding to an area that the user presses and holds, and adds the identifier of the current location to the request message.

After generating the request message, the terminal sends the request message to the map server, so that the map server can return the location relationship between the current location and the target location.

S302. Receive a location relationship that is between the current location and a target location and that is sent by the map server.

The location relationship is obtained by the map server based on location information of the current location and location information of the target location. The location information of the current location is obtained based on the identifier of the current location.

5303. Display the location relationship on a map.

After receiving the location relationship, the terminal can display the location relationship on the map, to provide direction guidance for the user. The terminal forms an indication line between the current location and the target location, and the terminal displays the location relationship between the current location and the target location on the indication line. The current location can be connected to the target location by using one indication line, and then the distance between the two points is displayed on the indication line. Optionally, the distance between the current location and the target location is displayed based on a predetermined distance interval. After the current location and the target location are connected by using one indication line, several coverage circles can be formed between the current location and the target location based on the predetermined distance interval. Then, a distance between each coverage circle and the target location is calculated based on the distance interval, and the distance is marked on the coverage circle.

Further, after the terminal displays the location relationship on the map, the terminal can monitor a predetermined operation used to trigger sending of a return instruction to the map server. The return instruction is used to instruct to return a map view to a map view corresponding to the target location. After the user learns about the surrounding situation of the target location by moving or scaling up/down the map, the user may want to return to the target location. In this implementation, to conveniently return the map view to the map view corresponding to the target location, the user can trigger, by using some predetermined operations, the terminal to generate the return instruction, and return the map from a map view corresponding to the current location to the map view corresponding to the target location based on the return instruction. To improve convenience of return, the user can shake a terminal (for example, a mobile phone) to trigger the terminal to send the return instruction to the map server. That is, the terminal monitors the predetermined operation used to trigger sending of the return instruction to the map server, and the terminal sends the return instruction to the map server after the operation is detected.

After receiving the return instruction, the map server can return the map view from the map view corresponding to the current location to the map view corresponding to the target location based on the location relationship between the current location and the target location.

In this implementation, when the terminal attempts to obtain the location relationship between the current location and the target location, the terminal can send the request message to the map server, to obtain the location relationship between the current location and the target location. It can alleviate a problem that in a conventional map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship between the target location and the current location. It helps the user to perform navigation or positioning, thereby improving user experience.

Further, when the user needs to return to the target location, the terminal can switch the map view to the map view corresponding to the target location by sending the return instruction to the map server, without requiring the user to perform an operation such as manual dragging or scaling up/down. It is convenient, quick, and accurate, and better improves user experience.

Implementation 4

Figure 8:
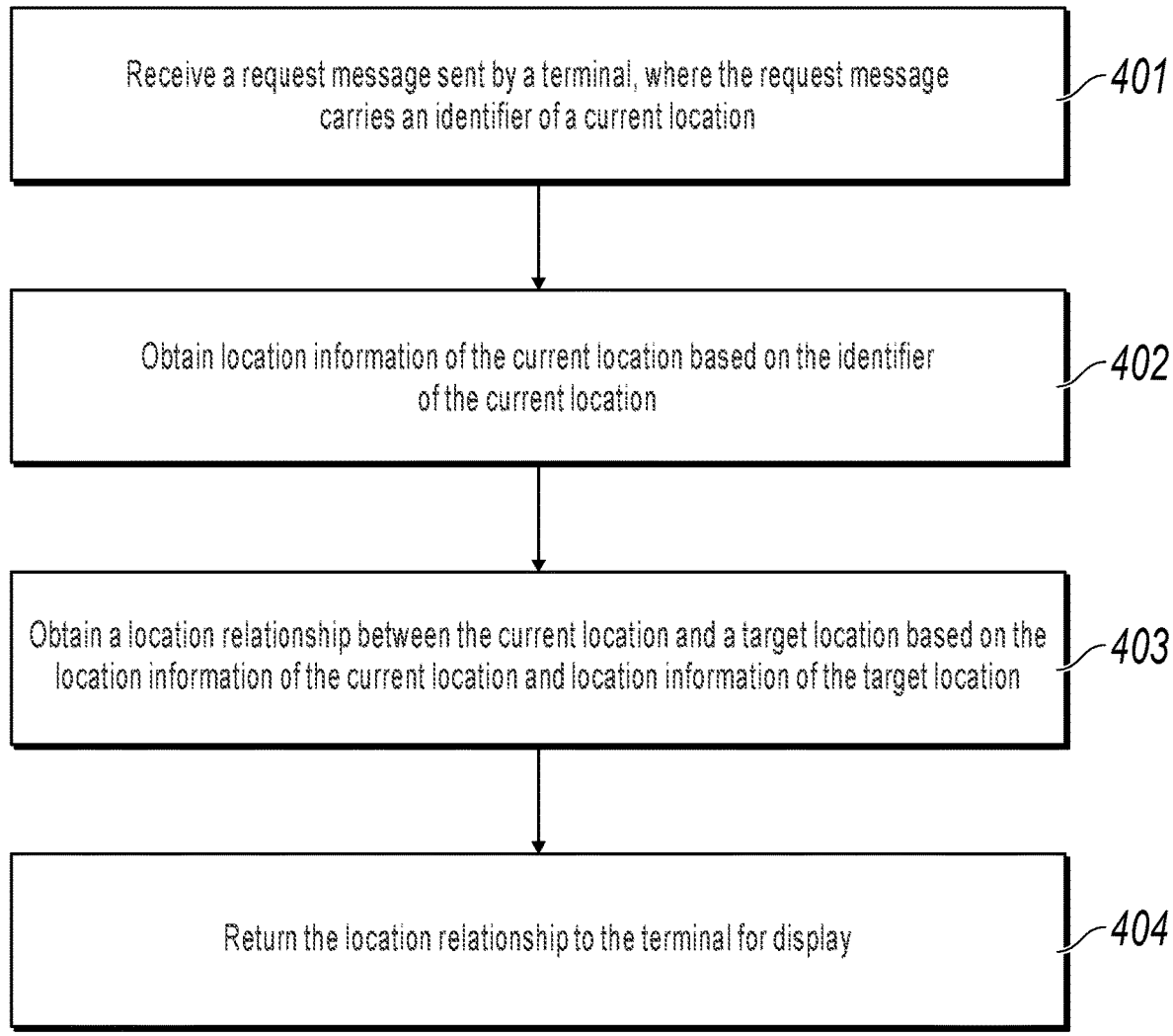
FIG. 8 is a schematic flowchart illustrating a method for displaying maps, according to implementations of the present invention.

FIG. 8 is a schematic flowchart illustrating a method for displaying maps, according to implementations of the present invention. As shown in FIG. 8, the method for displaying maps includes the following steps.

S401. Receive a request message sent by a terminal, where the request message carries an identifier of a current location.

In this implementation, the method for displaying maps is performed by a map server.

When a user attempts to know a location relationship between the current location and a target location, the user can send the request message to the map server by using the terminal. The map server can receive the request message, where the request message carries the identifier of the current location.

S402. Obtain location information of the current location based on the identifier of the current location.

After receiving the request message sent by the terminal, the map server obtains the identifier of the current location from the request message, and then finds the location information of the current location based on the identifier of the current location. The location information is geographical coordinates of the current location, that is, longitude and latitude data of the current location.

S403. Obtain a location relationship between the current location and a target location based on the location information of the current location and location information of the target location.

After obtaining the location information of the current location, the map server can calculate the location relationship between the two locations based on the location information of the current location and the location information of the target location, to obtain the location relationship between the current location and the target location. The location relationship is a distance between the current location and the target location and an orientation relationship between the current location and the target location.

In this implementation, before the map server obtains the location relationship between the current location and the target location, the map server further needs to obtain the location information of the target location. The map server can obtain the location information of the target location when searching for the target location. The location information is geographical coordinates of the target location, that is, longitude and latitude data of the target location.

S404. Return the location relationship to the terminal for display.

After the map server obtains the location relationship between the current location and the target location, the map server can return the location relationship to the terminal. After receiving the location relationship, the terminal can display the location relationship on a map, to provide direction guidance for the user.

Further, the map server can further receive a return instruction sent by the terminal, where the return instruction is used to instruct to return the map view to a view corresponding to the target location.

After receiving the return instruction, the map server switches the map view from a map view corresponding to the current location to the map view corresponding to the target location.

In this implementation, the map server can obtain the location information of the current location and the location information of the target location, so that the map server can determine the location relationship between the current location and the target location. It can alleviate a problem that in the existing map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

Further, when the user needs to return to the target location, the terminal can switch the map view to the map view corresponding to the target location only by sending the return instruction to the map server, without requiring the user to perform an operation such as manual dragging or scaling up/down. It is convenient, quick, and accurate, and improves user experience.

Implementation 5

Figure 9:
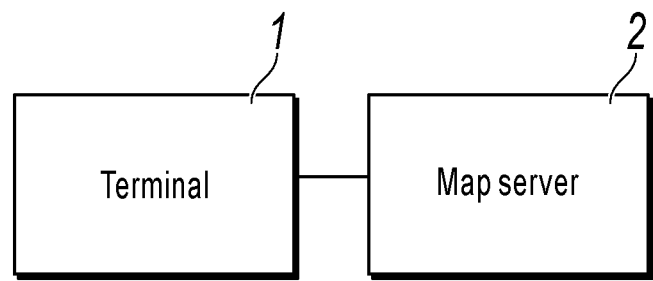
FIG. 9 is a schematic structural diagram illustrating a system for displaying maps, according to implementations of the present invention.

FIG. 9 is a schematic structural diagram illustrating a system for displaying maps, according to implementations of the present invention. As shown in FIG. 9, the system for displaying maps includes terminal 1 and map server 2.

Terminal 1 is configured to send a request message to map server 2, where the request message carries an identifier of a current location.

Map server 2 is configured to obtain location information of the current location based on the identifier of the current location, obtain a location relationship between the current location and a target location based on the location information of the current location and location information of the target location, and return the location relationship to terminal 1 for display.

The location relationship includes a distance between the current location and the target location and an orientation relationship between the current location and the target location.

Further, terminal 1 is configured to detect a gesture of a user, and generate the request message based on the current location corresponding to an area that the user presses and holds when detecting that the user presses and holds a screen.

Further, terminal 1 is configured to form an indication line between the current location and the target location, and display the location relationship on the indication line.

Further, map server 2 is further configured to obtain the location information of the target location.

Further, terminal 1 is further configured to monitor a predetermined operation used to trigger sending of a return instruction to map server 2, and send the return instruction to map server 2 after the operation is monitored.

The return instruction is used to instruct to return a map view to a map view corresponding to the target location.

Further, map server 2 is further configured to return a map view corresponding to the current location to the map view corresponding to the target location based on the return instruction and the location relationship.

In this implementation, the map server can obtain the location information of the current location and the location information of the target location, so that the map server can determine the location relationship between the current location and the target location. It can alleviate a problem that in a conventional map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

Further, when the user want to return to the target location, the terminal can switch the map view to the map view corresponding to the target location only by sending the return instruction to the map server, without requiring the user to perform an operation such as manual dragging or scaling up/down. It is convenient, quick, and accurate, and improves user experience.

Implementation 6

Figure 10:
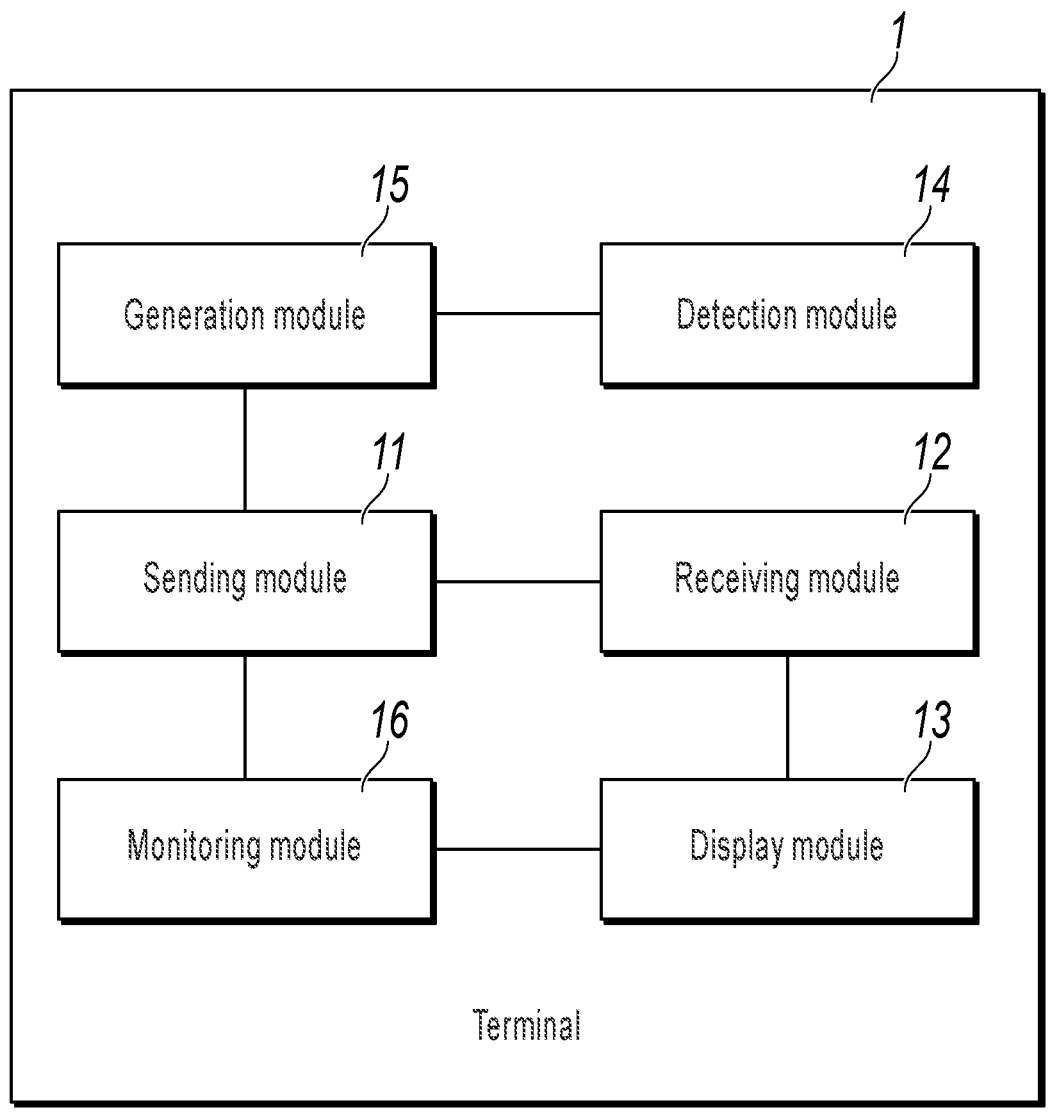
FIG. 10 is a schematic structural diagram illustrating a terminal, according to implementations of the present invention.

FIG. 10 is a schematic structural diagram illustrating a terminal, according to implementations of the present invention. As shown in FIG. 10, terminal 1 includes sending module 11, receiving module 12, and display module 13.

Sending module 11 is configured to send a request message to a map server, where the request message carries an identifier of a current location.

Receiving module 12 is configured to receive a location relationship that is between the current location and a target location and that is sent by the map server, where the location relationship is obtained by the map server based on location information of the current location and location information of the target location, and the location information of the current location is obtained based on the identifier of the current location.

Display module 13 is configured to display the location relationship on a map.

The location relationship includes a distance between the current location and the target location and an orientation relationship between the current location and the target location.

Further, terminal 1 further includes detection module 14 and generation module 15.

Detection module 14 is configured to detect a gesture of a user.

Generation module 15 is configured to generate the request message based on the current location corresponding to an area that the user presses and holds when detecting that the user presses and holds a screen.

Further, display module 13 is configured to form an indication line between the current location and the target location, and display the location relationship on the indication line.

Further, terminal 1 further includes monitoring module 16.

Monitoring module 16 is configured to monitor a predetermined operation used to trigger sending of a return instruction to the map server, where the return instruction is used to instruct to return a map view to a map view corresponding to the target location.

Sending module 11 is further configured to send the return instruction to the map server after the operation is monitored, so that the map server returns a map view corresponding to the current location to the map view corresponding to the target location based on the return instruction and the location relationship.

In this implementation, when the terminal attempts to obtain the location relationship between the current location and the target location, the terminal can send the request message to the map server, to obtain the location relationship between the current location and the target location. It can alleviate a problem that in the existing map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

Further, when the user needs to return to the target location, the terminal can switch the map view to the map view corresponding to the target location by sending the return instruction to the map server, without requiring the user to perform an operation such as manual dragging or scaling up/down. It is convenient, quick, and accurate, and better improves user experience.

Implementation 7

Figure 11:
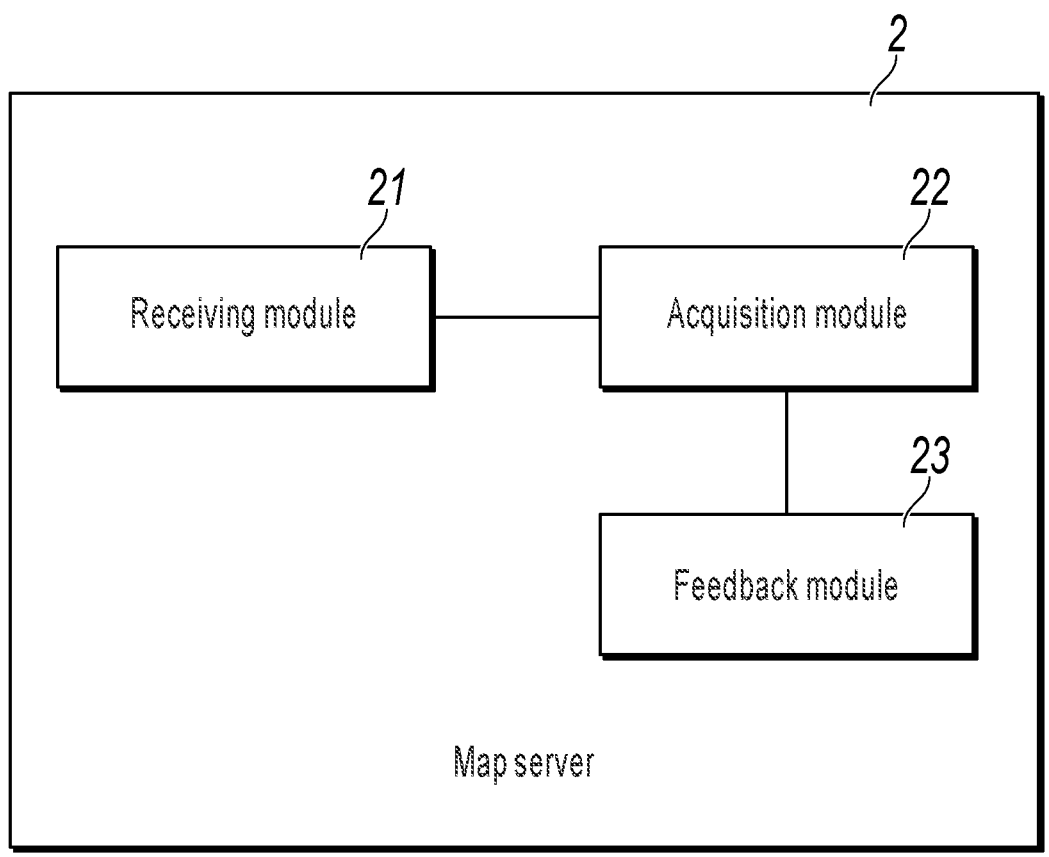
FIG. 11 is a schematic structural diagram illustrating a map server, according to implementations of the present invention.

FIG. 11 is a schematic structural diagram illustrating a map server, according to implementations of the present invention. As shown in FIG. 11, map server 2 includes receiving module 21, acquisition module 22, and feedback module 23.

Receiving module 21 is configured to receive a request message sent by a terminal, where the request message carries an identifier of a current location.

Acquisition module 22 is configured to obtain location information of the current location based on the identifier of the current location, and obtain a location relationship between the current location and a target location based on the location information of the current location and location information of the target location.

Feedback module 23 is configured to return the location relationship to the terminal for display.

The location relationship includes a distance between the current location and the target location and an orientation relationship between the current location and the target location.

Further, acquisition module 22 is further configured to obtain the location information of the target location.

Further, receiving module 21 is further configured to receive a return instruction sent by the terminal, so that map server 2 returns the map view corresponding to the current location to a map view corresponding to the target location based on the return instruction and the location relationship.

In this implementation, the map server can obtain the location information of the current location and the location information of the target location, so that the map server can determine the location relationship between the current location and the target location. It can alleviate a problem that in the existing map display on an intelligent terminal, a user usually loses a sense of direction and a sense of distance after moving or scaling up/down a map, resulting in low navigation efficiency. After the user moves or scales up/down the map, when a target location disappears from the field of view, the user can know a distance between a current location and the target location and a current orientation relative to the target location based on a location relationship. It helps the user to perform navigation or positioning, thereby improving user experience.

Further, when the user needs to return to the target location, the terminal can switch the map view to the map view corresponding to the target location by sending the return instruction to the map server, without requiring the user to perform an operation such as manual dragging or scaling up/down. It is convenient, quick, and accurate, and better improves user experience.

Persons of ordinary skill in the art can understand that all or some of the steps of the method implementations can be implemented by a program instructing related hardware. The program can be stored in a computer-readable storage medium. When the program runs, the steps of the method implementations are performed. The previous storage medium includes any medium that can store program code, such as a ROM, a RAM, a magnetic disk, or an optical disc.

Finally, it is worthwhile to note that the previous implementations are merely intended to describe the technical solutions of the present invention, but not intended to limit the present invention. Although the present invention is described in detail with reference to the previous implementations, persons of ordinary skill in the art should understand that they can still make modifications to the technical solutions described in the previously described implementations or make equivalent replacements to some or all technical features thereof, without departing from the scope of the technical solutions of the implementations of the present invention.

Figure 12:
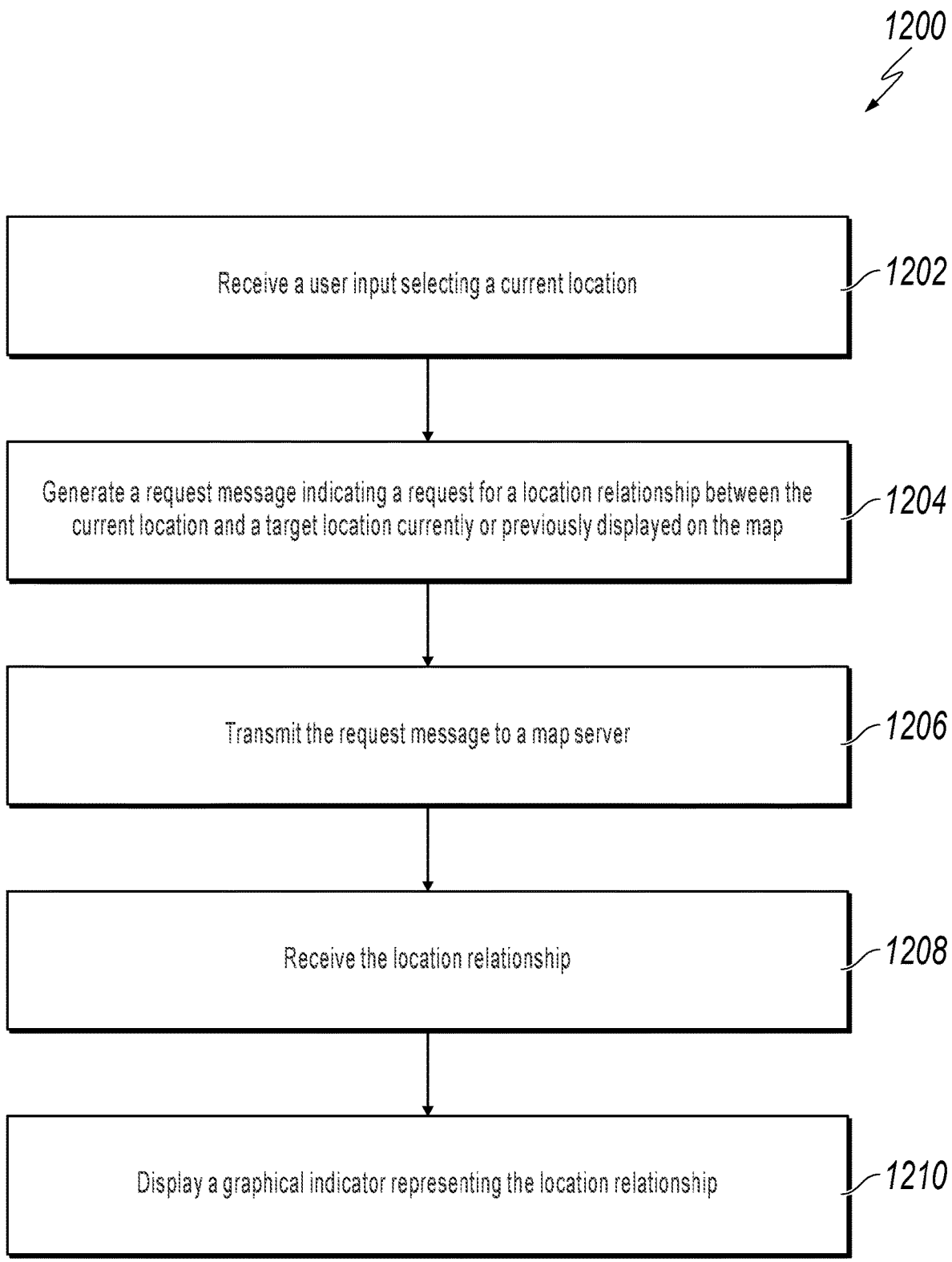
FIG. 12 is a schematic flowchart illustrating a method for displaying location relationship between two points on a map, according to implementations of the present invention.

FIG. 12 is a flowchart illustrating an example computer-implemented method 1200 for displaying location relationship between two points on a map, according to an implementation of the present disclosure. For clarity of presentation, the description that follows generally describes method 1200 in the context of the other figures in this description. For example, method 1200 can be performed by the terminal device of FIG. 10. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, a user input selecting a current location is received, for example, by a terminal device. The current location is displayed within a map that is displayed on a screen of the terminal device. The user input may be, for example, in a form of clicking, holding, or pressing on an area of the terminal device's screen that currently displays the current location. Accordingly, the user does not need to type a name or an address of the current location in order to select the current location. From 1202, method 1200 proceeds to 1204.

Figure 1:
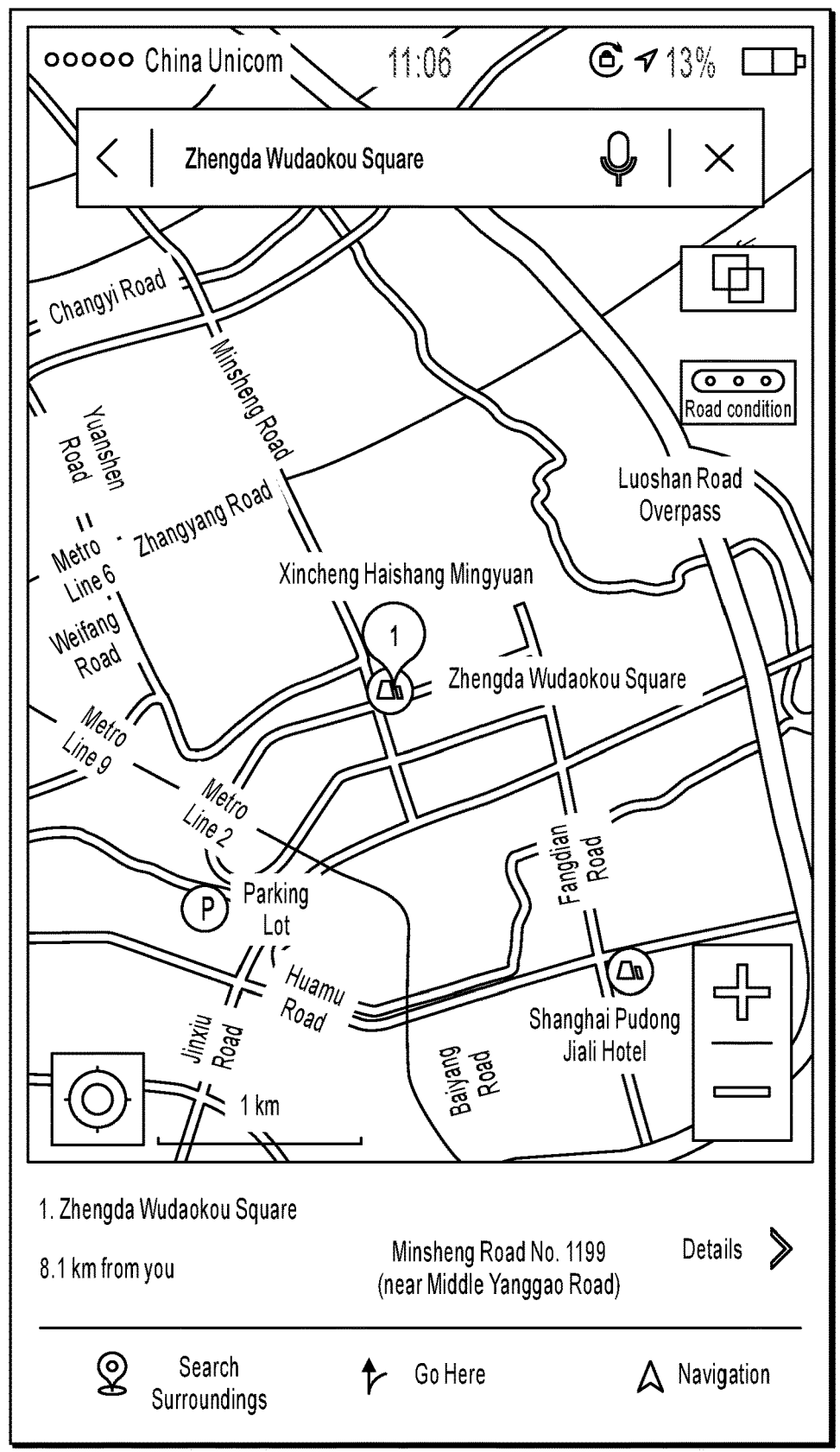
FIG. 1 is a schematic diagram illustrating a map view in a map navigation.
Figure 2:
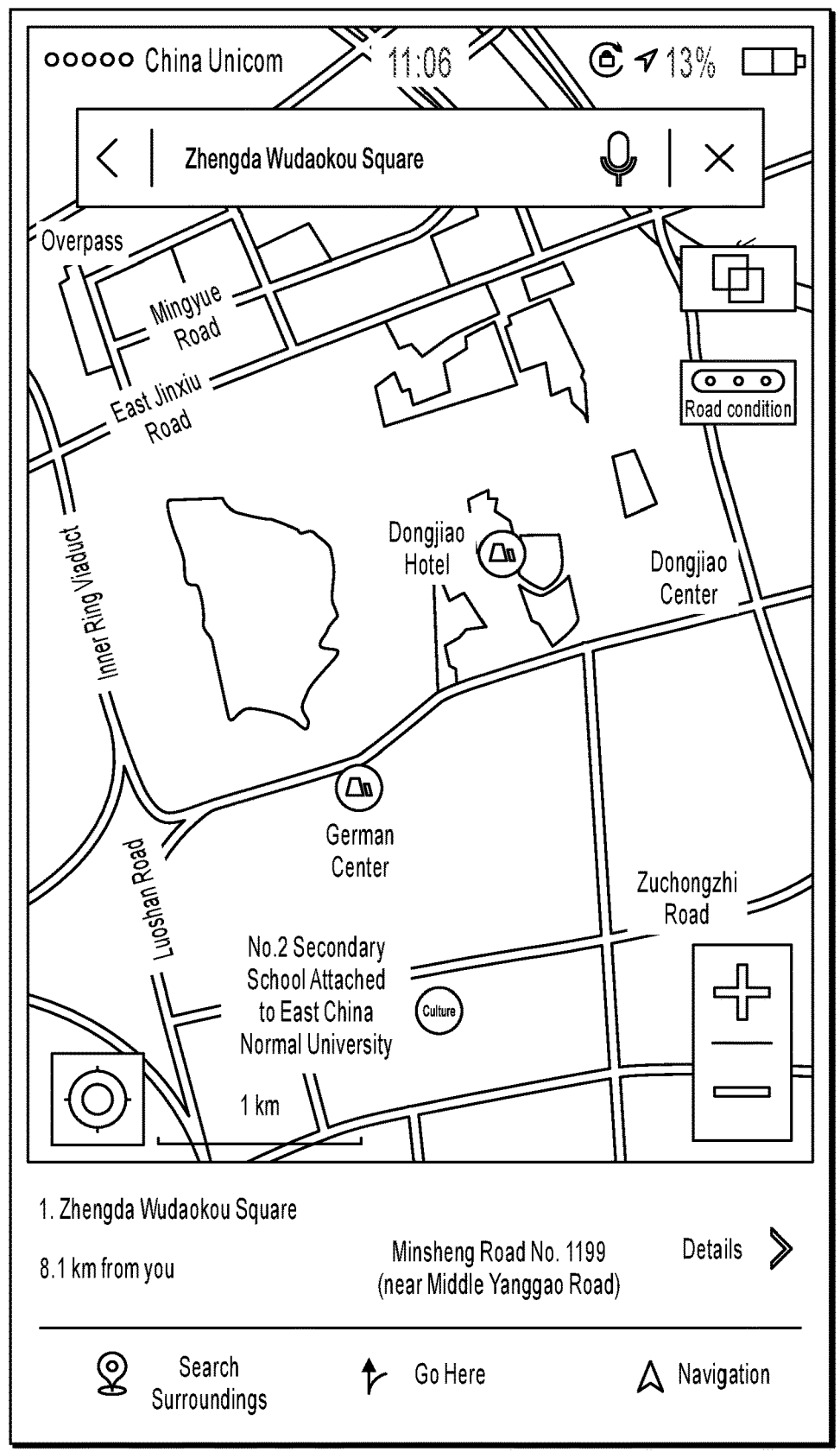
FIG. 2 is a schematic diagram illustrating a map view in a map navigation.

At 1204, a request message is generated. The request message indicates a request for a location relationship between the selected current location and a target location. The target location is a location currently or previously displayed on the map, for example, as a result of a search submitted by the user. For example, FIG. 1 illustrates a map that displays a target location 1 (which is Zhengda Wudaokou square) as a result of a search performed by receiving the name of the square typed by a user. The terminal device can generate the request message and can include an identifier of the current location in the request message. The identifier of the current location can be a name, a code, etc., of the current location. The identifier can be detected from the area of the screen that the user selects (for example, presses, holds, clicks on). From 1204, method 1200 proceeds to 1206.

At 1206, the request message is transmitted, for example, by the terminal device to a map server. The map server can be the map server of FIG. 11. The map server is configured to determine a geographical location of the current location and a geographical location of the target location. The map server can determine the geographical location of the current location based on the identifier included in the request message. The map server can determine the geographical location of the target location based on a prior search result that the map server had provided to the terminal device. A geographical location includes geographical longitude and latitude. From 1206, method 1200 proceeds to 1208.

At 1208, a location relationship between the selected current location and the target location is received, for example, by the terminal device. For example, the map server can transmit the location relationship to the terminal device. The map server can determine the location relationship based on the geographical location of the current location and the geographical location of the target location. Alternatively, or in addition, the terminal device may receive the geographical locations of the current and the target locations from the map server and determine the location relationship based on the geographical locations. The location relationship can include a distance and an orientation of the distance between the current location and the target location. From 1208, method 1200 proceeds to 1210.

At 1210, a graphical indicator is displayed to represent the location relationship. The graphical indicator can be displayed on the terminal device's screen. The graphical indicator can include an indication line displayed between the current location and the target location on the map. The graphical indicator can represent the distance between the current location and the target location by a value that is, for example, illustrated on or around the indication line. As noted above, the distance can be determined based on the location relationship.

A graphical indicator provides a user a measurement of an orientation and a value of the distance between the target and the current locations. FIG. 4 illustrates an example graphical indicator that includes an indication line and a value "5" indicating a distance between the current location (which is the hotel) and the target location (which is the square). FIG. 5 illustrates another example graphical indicator that includes one or more circles centered at the target location. Each circle is marked with a value indicating a distance from the target location.

In some implementation, 1202 is performed by receiving the user selection on a modified map. For example, a user may modify a map so that the user can explore surroundings of the target location. Modification can include rescaling (for example, scaling up or down) or moving (for example, repositioning) the map. The modified map displays the current location.

In some implementations, the terminal device monitors user interactions with the terminal device to detect a predetermined operation used to trigger transmitting of a return instruction to the map server. Examples of the predetermined operations can include, but are not limited to selecting a particular option on the screen, detecting a particular shaking or moving of the terminal device (for example, the user may shake the terminal device to right and left, or up and down), etc.

The return instruction is used to instruct to return to a first map view that displays the current location or the graphical indicator, to a second map view corresponding to the target location (for example, a map view that displays the target location). The terminal device transmits the return instruction to the map server upon detecting the predetermined operation. The map server returns the first map view to the second map view based on the return instruction and the location relationship, and transmits the first map view to the terminal device. The terminal device receives and displays the second map view.

The present disclosure provides systems and methods that perform actions including: receiving a user input selecting a current location within a map displayed on a screen of the terminal device; generating a request message indicating a request for a location relationship between the selected current location and a target location, the request message including an identifier of the current location, the target location being a location currently or previously displayed on the map; transmitting the request message to a map server configured to determine a geographical location of the current location and a geographical location of the target location; receiving, from the map server, a location relationship between the current location and the target location, wherein the location relationship is determined based on the geographical location of the current location and the geographical location of the target location; and displaying a graphical indicator representing the location relationship. Other implementations include corresponding systems, apparatus, and computer programs, configured to perform the actions of the methods, encoded on computer storage devices.

These and other implementations may each optionally include one or more of the following features: the user input consists of clicking, holding, or pressing on an area of the screen that displays the current location; the location relationship comprises: a distance between the current location and the target location, and an orientation relationship between the current location and the target location; the actions further comprising: detecting a modification of the map, and in response, providing a modified map that includes the current location; the modification of the map comprises at least one of rescaling and repositioning the map; the graphical indicator comprises: an indication line displayed between the current location and the target location on the map, and a value representing a distance between the current location and the target location, the distance being determined based on the location relationship; in response to receiving the location relationship, the method further comprises: terminal device, a predetermined operation used to trigger transmitting of a return instruction to the map server, wherein the return instruction is used to instruct to return to a first map view that displays the current location or the graphical indicator, to a second map view corresponding to the target location, transmitting the return instruction to the map server upon detecting the predetermined operation, receiving, from the map server, the first map view, wherein the map server returns the first map view to the second map view based on the return instruction and the location relationship, and displaying the second map view corresponding to the target location.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Methods in accordance with the present disclosure may include any combination of the aspects and features described herein. That is, methods in accordance with the present disclosure are not limited to the combinations of aspects and features specifically described herein, but also include any combination of the aspects and features provided.

Among other advantages, implementations of the present disclosure provide the following technical advantages to technical issues. The implementations improve the processing speed in retrieving information about relative positions of multiple locations on a map. In general, users of terminal devices can search for a target (or primary) location on a map by typing in an address or a name of the target location. When a user wants to check surroundings of the target location, the user may reposition (or move) or rescale the map. Once the user finds a secondary location, the user may want to know how far the secondary location is from the target location. Conventionally, the user would have to guess the distance by looking at the map. In some cases, the user may even lose a view of the target location when rescaling or repositioning the map, making it even harder to estimate the distance between the secondary location and the target location. To get an accurate estimation of a distance between the target and the secondary locations, the user would have to enter a name or an address of each of the two locations separately, which would result in losing a current map view where the user was using to explore the surroundings of the target location.

Implementations of the present disclosure provide a technique to determine a location relationship (including distance and orientation) between a target location and a secondary location without a need to enter each of those locations separately. When a user rescales a map or moves the map to explore the surroundings of a target location, the user may select the secondary location (also referred to as the "current location" herein) to view the distance between the target and the secondary location without a need to enter an address or a name of the secondary location and without losing a map view that illustrated the current location. Even if the user loses a view of the target location on the map when repositioning or rescaling the map, the user can still get a distance between the two locations with a single selection operation. The selection operation can be as simple as clicking, holding, or pressing on an area of the screen that displays the secondary location.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
   receiving, by a terminal device, an input query specifying a target location to be presented within a map displayed on a screen of the terminal device;
   receiving, by the terminal device, a user input selecting a current location that is currently presented within the map displayed on the screen of the terminal device, the user input comprising a user press and hold operation performed on the screen of the terminal device;
   generating, by the terminal device, a request message indicating a request for a location relationship between the current location and the target location, the request message comprising an identifier of the current location;
   transmitting, by the terminal device, the request message to a map server configured to determine a geographical location of the current location and a geographical location of the target location;
   receiving, by the terminal device and from the map server, a location relationship between the current location and the target location, wherein the location relationship is determined based on the geographical location of the current location and the geographical location of the target location;
   detecting, by the terminal device, a predetermined operation used to trigger transmitting of a return instruction to the map server, wherein the return instruction is used to instruct to return from a first map view that displays the current location and a graphical indicator, to a second map view corresponding to the target location;
   in response to detecting the predetermined operation, transmitting, by the terminal device, the return instruction to the map server;
   receiving, by the terminal device and from the map server, the second map view; and
   displaying, by the terminal device, the second map view corresponding to the target location and the graphical indicator representing the location relationship between the target location of the input query and the current location of the user press and hold operation, the graphical indicator comprising an indicator line and a distance value that are determined based on the location relationship, the indicator line comprising a straight line connecting a representation of the current location to a representation of the target location, the distance value representing a distance between the current location and the target location depicted by the indicator line.

2. The computer-implemented method of claim 1, wherein the user input comprises a long press on an area of the screen that displays the current location.

3. The computer-implemented method of claim 1, wherein the location relationship comprises:
   the distance value; and
   an orientation relationship between the current location and the target location.

4. The computer-implemented method of claim 1, further comprising:
   detecting, by the terminal device, a modification of the map; and
   providing a modified map that includes the current location.

5. The computer-implemented method of claim 4, wherein the modification of the map comprises at least one of rescaling and repositioning the map.

6. The method of claim 1, wherein the graphical indicator further includes one or more arches formed between the target and the current locations, each arch of the one or more arches being a portion of a respective circle that is centered at the target location and has a respective radius that represents a predetermined distance from the target location.

7. A non-transitory, computer-readable medium storing one or more instructions executable by a computer system to perform operations comprising:
   receiving an input query specifying a target location to be presented within a map displayed on a screen of a terminal device;
   receiving a user input selecting a current location that is currently presented within the map displayed on the screen of the terminal device, the user input comprising a user press and hold operation performed on the screen of the terminal device;
   generating a request message indicating a request for a location relationship between the current location and the target location, the request message comprising an identifier of the current location;
   transmitting the request message to a map server configured to determine a geographical location of the current location and a geographical location of the target location;
   receiving, from the map server, a location relationship between the current location and the target location, wherein the location relationship is determined based on the geographical location of the current location and the geographical location of the target location;
   detecting a predetermined operation used to trigger transmitting of a return instruction to the map server, wherein the return instruction is used to instruct to return from a first map view that displays the current location and a graphical indicator, to a second map view corresponding to the target location;
   in response to detecting the predetermined operation, transmitting the return instruction to the map server;
   receiving, from the map server, the second map view; and
   displaying the second map view corresponding to the target location and the graphical indicator representing the location relationship between the target location of the input query and the current location of the user press and hold operation, the graphical indicator comprising an indicator line and a distance value that are determined based on the location relationship, the indicator line comprising a straight line connecting a representation of the current location to a representation of the target location, the distance value representing a distance between the current location and the target location depicted by the indicator line.

8. The non-transitory, computer-readable medium of claim 7, wherein the user input comprises a long press on an area of the screen that displays the current location.

9. The non-transitory, computer-readable medium of claim 7, wherein the location relationship comprises:
   the distance value; and
   an orientation relationship between the current location and the target location.

10. The non-transitory, computer-readable medium of claim 7, wherein the operations further comprise:

detecting, by the terminal device, a modification of the map; and providing a modified map that includes the current location.

11. The non-transitory, computer-readable medium of claim 10, wherein the modification of the map comprises at least one of rescaling and repositioning the map.

12. The non-transitory, computer-readable medium of claim 7, wherein the graphical indicator further includes one or more arches formed between the target and the current locations, each arch of the one or more arches being a portion of a respective circle that is centered at the target location and has a respective radius that represents a predetermined distance from the target location.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving an input query specifying a target location to be presented within a map displayed on a screen of a terminal device;
receiving a user input selecting a current location that is currently presented within the map displayed on the screen of the terminal device, the user input comprising a user press and hold operation performed on the screen of the terminal device;
generating a request message indicating a request for a location relationship between the current location and the target location, the request message comprising an identifier of the current location;
transmitting the request message to a map server configured to determine a geographical location of the current location and a geographical location of the target location;
receiving, from the map server, a location relationship between the current location and the target location, wherein the location relationship is determined based on the geographical location of the current location and the geographical location of the target location;

detecting a predetermined operation used to trigger transmitting of a return instruction to the map server, wherein the return instruction is used to instruct to return from a first map view that displays the current location and a graphical indicator, to a second map view corresponding to the target location;

in response to detecting the predetermined operation, transmitting the return instruction to the map server;

receiving, from the map server, the second map view; and displaying the second map view corresponding to the target location and the graphical indicator representing the location relationship between the target location of the input query and the current location of the user press and hold operation, the graphical indicator comprising an indicator line and a distance value that are determined based on the location relationship, the indicator line comprising a straight line connecting a representation of the current location to a representation of the target location, the distance value representing a distance between the current location and the target location depicted by the indicator line.

14. The computer-implemented system of claim 13, wherein the user input comprises a long press on an area of the screen that displays the current location.

15. The computer-implemented system of claim 13, wherein the location relationship comprises:
the distance value; and
an orientation relationship between the current location and the target location.

16. The computer-implemented system of claim 13, wherein the operations further comprise:
detecting, by the terminal device, a modification of the map; and
providing a modified map that includes the current location.

17. The computer-implemented system of claim 13, wherein the graphical indicator further includes one or more arches formed between the target and the current locations, each arch of the one or more arches being a portion of a respective circle that is centered at the target location and has a respective radius that represents a predetermined distance from the target location.

\* \* \* \* \*

UNITED STATES PATENT AND TRADEMARK OFFICE
CERTIFICATE OF CORRECTION

Page 1 of 1

PATENT NO. : 10,712,167 B2
APPLICATION NO. : 16/419742
DATED : July 14, 2020
INVENTOR(S) : Wen Zhao It is certified that error appears in the above-identified patent and that said Letters Patent is hereby corrected as shown below:

On the Title Page

Item (56), Under Other Publications
Column 2, Line 2, delete "//youtu.be/" and insert -- //youtube/ --, therefor.

Signed and Sealed this
Third Day of November, 2020

Andrei Iancu
*Director of the United States Patent and Trademark Office*